Dec. 2, 1969  W. Y. HUTCHINSON  3,481,415
PORTABLE SCALE WITH HAND CARRYING HOLE IN PLATFORM
Filed Feb. 4, 1969
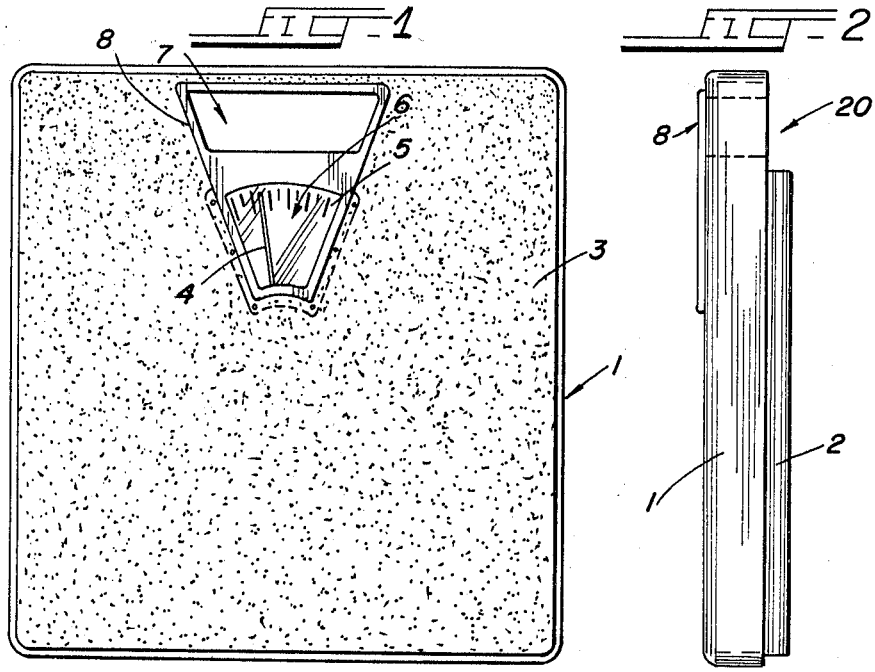
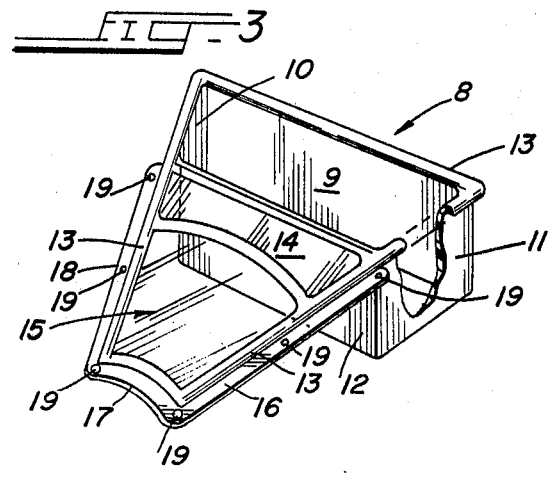
INVENTOR.
WILLIAM Y. HUTCHINSON _United States Patent Office_

3,481,415
Patented Dec. 2, 1969

3,481,415
PORTABLE SCALE WITH HAND CARRYING HOLE IN PLATFORM
William Y. Hutchinson, Chicago, Ill., assignor to Continental Scale Corporation, Chicago, Ill., a corporation of Delaware
Filed Feb. 4, 1969, Ser. No. 796,402
Int. Cl. G01g 21/22
U.S. Cl. 177—253                  6 Claims

ABSTRACT OF THE DISCLOSURE

A portable scale is provided having a supporting base, a platform in assembled relation to said base and a hand hole within the confines of said platform whereby said scale can be picked up and carried by inserting the fingers of one hand into said hole. The hand hole is preferably constructed with a plastic insert extending inwardly from the sides thereof and having a portion extending over the platform and around sides of a dial viewing opening.

GENERAL DISCLOSURE

This invention relates to a portable scale of the type commonly referred to as a bathroom scale, and more particularly to a portable scale having a supporting base, a platform in assembled relation to said base and means within the confines of said platform whereby said scale can be picked up and transported readily or, if desired, suspended from a nail, peg or other projection from a wall or partition.

PRIOR ART

Various types of portable bathroom scales have heretofore been manufactured or proposed which are constructed with handles or similar carrying devices. A number of scales of this type are illustrated in U.S. Patents 3,097,966, 3,101,804, 3,185,233 and 3,243,002. These carrying devices are usually in the form of attachments to either the base or the platform of the scale and they normally project outwardly so that they are susceptible to distortion or breakage in case the scale is accidentally or forceably displaced against a wall or other object.

OBJECTS

One of the objects of this invention is to provide a new and improved portable scale having new and improved means for picking up and carrying the scale.

Another object of the invention is to provide a new and improved portable scale which is simple and economical to construct.

Still another object of the invention is to provide a new and improved portable scale which does not have projecting handles or other similar carrying devices but is provided with means which facilitate picking up and transporting the scale.

THE DRAWINGS

Other objects and advantages of the invention will appear from the following description in conjunction with the accompanying drawings in which FIGURE 1 is a top plan view of a portable scale illustrating one embodiment of the invention;

FIGURE 2 is a side elevational view of the portable scale shown in FIGURE 1, and FIGURE 3 is an enlarged view of a plastic insert adapted to be assembled with the portable scale shown in FIGURES 1 and 2.

THE INVENTION

In accordance with the invention a portable scale is provided which comprises a supporting base, a platform in assembled relation to said base, but supported on and movable downwardly with respect thereto in a weighing operation when said base and platform are horizontally disposed for use in weighing with the base resting on the floor, and means forming a hand hole within the confines of said platform whereby said scale can be picked up and carried by inserting the fingers of one hand into said hole.

In a preferred embodiment of the invention as shown in the drawings, the scale platform is provided with a viewing opening for viewing a dial and a weight indicating device associated with said dial, said hand hole is spaced from but adjacent said viewing opening, and a molded insert is associated with said hand hole and said viewing opening, said insert extending inwardly from the sides of said hand hole and having a portion extending over the space between said hand hole and said viewing opening and around sides of said viewing opening, said portion being secured to said platform.

The aforementioned insert can be constructed of any suitable material, for example, molded or stamped metal, molded fiber, mixtures of molded fibers and resins, or molded plastics such as nylon (polyamide plastics), polypropylene or phenol formaldehyde resins, or polyester resins or other materials of a similar type which can be molded into articles of substantial rigidity.

Referring to FIGURES 1 and 2 of the drawings, the portable scale shown consists of a platform 1 and a supporting base 2. The upper surface of the platform 1 is provided with a covering 3 which can be held in place by adhesive, or in any other suitable manner, and affords a surface on which the user can stand. The platform 1 is preferably generally rectangular in shape but it can have other shapes and the sides can be tapered rather than parallel. If desired, the platform can even be circular or oblong. A conventional scale mechanism, not shown, is mounted in the base 2 and has an indicating device or pointer 4 which is associated with a dial 5 to indicate the weight of the user. The dial and weight indicating devices 4 and 5 are visible through a viewing opening 6 in the platform 1. In accordance with the invention a hand hole 7 is provided which is adjacent but spaced from the viewing opening 6.

In order to make it easier to grip the hand hole, the latter is provided with an insert 8 as shown in FIGURE 3. The insert 8 is preferably molded or otherwise formed in a single piece from a material of the type previously described as, for example, a thermoplastic resin, and is constructed with four side walls, 9, 10, 11 and 12 that extend a substantial distance into the opening 7 of platform 1 when the insert is assembled with the platform. The insert 8 also has an integrally molded lip or rim 13 which extends outwardly so that the lower portion thereof will rest on the top of the platform 1 when the insert is placed in position in the opening 7. The rim 13 can be either flat or curved and can be thicker than the body portion 11 in order to provide additional rigidity. The insert 8 also has a horizontal portion 14 which is integral with the rim portion 13 and the upper part of wall 12 and extends to the portion 15, the latter being substantially coextensive with the dial opening 6. Since it is necessary to view the dial and the weight indicating device through the opening 6, the portion 15 can either be cut out to form another opening or it can be covered with a transparent material as, for example, a transparent plastic material. The sides of the rim 13 adjacent the portions 14 and 15 have outwardly extending portions 16, 17 and 18 which are secured by means of screws, or in any other suitable manner, to the top of the platform 1. For this purpose a series of holes 19 can be provided.

As shown in FIGURE 2 the platform 1 can project beyond the base 2 so that the portion of the platform carrying the hand hole in the general region indicated by the numeral 20 is beyond the base portion 2 and cannot interfere with the weighing mechanism. However, the scale can also be constructed with the base portion 2 substantially coextensive, although somewhat smaller in area than the platform 1.

It will be understood that modifications and variations can be made in the structure described without departing from the invention.

UTILITY

A scale of the type described is simple to construct because it is only necessary to provide an opening in the platform which does not interfere with the use or operation of the scale. If desired, only a single generally triangular opening can be made into which an insert of the type shown in FIGURE 3 can be applied. The insert of the type shown provides a surface which extends inwardly a sufficient distance so that it is easy to grasp the scale and at the same time it is practically impossible to cut or otherwise injure the fingers of the hand used in the picking up and transporting of the scale. The opening in the platform can also be used to hang the scale on a nail, hook or other projection supported by a wall, partition, or other suitable surface.

The invention is hereby claimed as follows:

1. A portable scale comprising a supporting base, a platform in assembled relation to said base but supported on and movable downwardly with respect thereto in a weighing operation when said base and platform are horizontally disposed for use in weighing with the base resting on a floor, and means forming a hand hole within the confines of said platform whereby said scale can be picked up and carried by inserting the fingers of one hand into said hole.

2. A scale as claimed in claim 1 in which the sides of said hand hole comprise an insert which provides a supporting surface when the fingers of a hand are inserted into said hole and said scale is lifted.

3. A scale as claimed in claim 1 in which said scale has a viewing opening in said platform for viewing a dial and a weight indicating device associated with said dial, said viewing opening being spaced from a side of said platform and said hand hole being disposed in the space between said viewing opening and said side of said platform.

4. A scale as claimed in claim 1 in which said scale has a viewing opening in said platform for viewing a dial and a weight indicating device associated with said dial, said hand hole is spaced from but adjacent said viewing opening, and a molded insert is associated with said hand hole and said viewing opening, said insert extending inwardly from the sides of said hand hole and having a portion extending over the space between said hand hole and said viewing opening and around sides of said viewing opening, said portion being secured to said platform.

5. A scale as claimed in claim 1 in which said platform is generally rectangular and said hand hole is disposed adjacent one side of said platform.

6. A scale as claimed in claim 1 in which said platform projects beyond said base and said hand hole is disposed in the portion of said platform which projects beyond said base.

References Cited

UNITED STATES PATENTS 1,706,963    3/1929    Reeves _____ 177—253

FOREIGN PATENTS 439,773    12/1967    Switzerland.

ROBERT S. WARD, Jr., Primary Examiner

U.S. Cl. X.R.

177—182, 239